(12) United States Patent
Alibeigi et al.

(10) Patent No.: US 12,397,814 B2
(45) Date of Patent: Aug. 26, 2025

(54) TRAINING OF A PERCEPTION MODEL ON EDGE OF A VEHICLE

(71) Applicant: Zenseact AB, Gothenburg (SE)

(72) Inventors: Mina Alibeigi, Gothenburg (SE); Benny Nilsson, Alingsås (SE)

(73) Assignee: Zenseact AB, Gothenburg (SE)

( * ) Notice: Subject to any disclaimer, the term of this patent is extended or adjusted under 35 U.S.C. 154(b) by 318 days.

(21) Appl. No.: 18/161,417

(22) Filed: Jan. 30, 2023

(65) Prior Publication Data

US 2023/0303110 A1  Sep. 28, 2023

(30) Foreign Application Priority Data

Feb. 3, 2022 (EP) .................................. 22155017

(51) Int. Cl.
  *B60W 60/00* (2020.01)
  *G06N 3/09* (2023.01)
  *B60W 50/00* (2006.01)

(52) U.S. Cl.
  CPC ............. *B60W 60/00* (2020.02); *G06N 3/09* (2023.01); *B60W 2050/0075* (2013.01); *B60W 2420/408* (2024.01); *B60W 2556/35* (2020.02)

(58) Field of Classification Search
  CPC .................................................. B60W 60/00
  See application file for complete search history.

(56) References Cited

U.S. PATENT DOCUMENTS

| | | | |
|---|---|---|---|
| 10,657,391 B2* | 5/2020 | Chen ................ | G06V 20/58 |
| 11,373,115 B2* | 6/2022 | Kopp ................ | G06V 20/56 |
| 11,393,097 B2* | 7/2022 | Brunner ............ | G06T 7/20 |
| 11,428,537 B2* | 8/2022 | Lavy ................ | G06V 20/56 |
| 11,573,573 B2* | 2/2023 | Zheng .............. | G06V 20/56 |
| 11,586,854 B2* | 2/2023 | Ahuja .............. | G06V 10/774 |

(Continued)

FOREIGN PATENT DOCUMENTS

EP   1906339 A1   4/2008

OTHER PUBLICATIONS

European Search Report dated Jul. 14, 2022 for Patent Application No., 22155017.1, consisting of 13—pages.

(Continued)

*Primary Examiner* — Michael A Berns
(74) *Attorney, Agent, or Firm* — Weisberg I.P. Law, P.A.

(57) ABSTRACT

An annotation handling system for in an on edge-based manner training a supervised or semi-supervised perception model on edge of a vehicle equipped with an ADS. The annotation handling system stores while the vehicle is being driven, sensor data; selects annotation-eligible data out of the sensor data; generates a learning model candidate by annotating an event in the annotation-eligible data using a perception learning model; generates at least a first corroboration candidate by annotating the event based on perception predictions of the event derived from radar- and/or lidar-based sensor data of the obtained sensor data and/or based on identifying the event in a digital map; determines when one or more of the at least first corroboration candidate match the learning model candidate fulfilling corroboration criteria, an annotation of the event based on the learning model candidate and the first corroboration candidate; and updates the perception model based on the annotation.

20 Claims, 5 Drawing Sheets

(56) References Cited

U.S. PATENT DOCUMENTS

| | | | |
|---|---|---|---|
| 11,615,223 B2* | 3/2023 | Taralova | G06V 10/758 |
| | | | 382/104 |
| 11,704,890 B2* | 7/2023 | Yang | G06V 10/70 |
| 11,840,239 B2* | 12/2023 | Annapureddy | G06V 20/44 |
| 2018/0348784 A1 | 12/2018 | Zheng et al. | |
| 2020/0226430 A1 | 7/2020 | Ahuja et al. | |
| 2022/0277193 A1* | 9/2022 | Wekel | G06T 19/00 |
| 2023/0303110 A1* | 9/2023 | Alibeigi | G06V 20/58 |

OTHER PUBLICATIONS

SAE On-Road Automated Vehicle Standards Committee; Taxonomy and Definitions for Terms Related to Driving Automation Systems for On-Road Motor Vehicles; SAE J3016; Jun. 15, 2018, consisting of 3—pages.

J. Jiao; Machine Learning Assisted High-Definition Map Creation; 2018 42nd IEEE International Conference on Computer Software & Applications (COMPSAC); IEEE, vol. 1; Jul. 2018, consisting of 7—pages.

\* cited by examiner

TRAINING OF A PERCEPTION MODEL ON EDGE OF A VEHICLE

TECHNICAL FIELD

The present disclosure relates to in an on edge-based manner training a supervised or semi-supervised perception model on edge of a vehicle equipped with an Automated Driving System, ADS.

BACKGROUND

Within the automotive field, there has for quite some years been activity in the development of autonomous vehicles. An increasing number of modern vehicles have advanced driver-assistance systems, ADAS, to increase vehicle safety and more generally road safety. ADAS-which for instance may be represented by adaptive cruise control, ACC, collision avoidance system, forward collision warning, etc.—are electronic systems that may aid a vehicle driver while driving. Moreover, in a not-too-distant future, Autonomous Driving, AD, will to a greater extent find its way into modern vehicles. AD along with ADAS will herein be referred to under the common term Automated Driving System, ADS, corresponding to all different levels of automation, for instance as defined by the SAE J3016 levels (0-5) of driving automation. An ADS may be construed as a complex combination of various components that can be defined as systems where perception, decision making, and operation of the vehicle—at least in part—are performed by electronics and machinery instead of a human driver. This may include handling of the vehicle, destination, as well as awareness of surroundings. While the automated system has control over the vehicle, it allows the human operator to leave all or at least some responsibilities to the system. To perceive its surroundings, an ADS commonly combines a variety of sensors, such as e.g. radar, LIDAR, sonar, camera, navigation and/or positioning system e.g. GNSS such as GPS, odometer and/or inertial measurement units, upon which advanced control systems may interpret sensory information to identify appropriate navigation paths, as well as obstacles and/or relevant signage.

Furthermore, data privacy protection is becoming increasingly important and valued. To solve data privacy problem (s), for instance in view of deep learning (DL) algorithms, it is known in the art to use Federated learning (FL). It has been found that models trained by federated learning can achieve performance levels comparable to ones trained on centrally hosted data sets and performance levels superior to models that only see isolated single-institutional data. Federated learning applications are thus becoming more widespread, and this approach enables collaborative training without moving data beyond firewalls of organizations or edge devices in which the data was created or stored. Instead, training of algorithms is done at each participating organization or edge device, and only model characteristics—e.g. parameters and/or gradients—are transferred out of the organization. Consequently, this enables training machine learning (ML)/deep learning (DL)/artificial intelligence (AI) models-such as ADS ML/DL/AI models e.g. perception models-without transferring personal data to a remote server, effectively protecting data privacy and security. Furthermore, in using a federated learning approach, a need to move extensive amounts of data out of devices—such as from ADS-equipped vehicles—is reduced or even eliminated, thus resulting in potentially saving extensive amounts of bandwidth and/or storage while still utilizing learnings and/or results from such data successfully. Moreover, a federated learning approach may provide the opportunity of shortening a development loop and improve a software of an ADS, by enabling the utilization of data available on a potentially large fleet of production vehicles.

ADS-used ML/AI models known in the art are commonly supervised learning methods, which require annotated—e.g. labelled—data for training or update. Producing high-quality annotated/labelled data on edge—i.e. at respective ADS-equipped vehicle—is, however, not an easy task. Conventionally, data is collected by dedicated data collection or fleet vehicles and sent to a back office. After quality checks and curation steps, data is sent to off-site and/or in-house annotators for labelling. This approach is, however, not feasible in a federated learning setup, since the data is intended to stay on edge and thus cannot be transferred to the back office for annotation. Nor is it feasible with access to skilled human annotators on edge.

Furthermore, resources and/or sensors available in a fleet vehicle are often limited compared to dedicated data collection vehicles, which usually are equipped with costly and high-precision ground-truth sensors. This limitation may significantly affect the quality of annotated data on edge in fleet vehicles, which in turn may impact the quality of ADS learning models; if the quality of annotations is insufficient, the performance of the trained modules could be degraded.

In other words, considering the limitations for annotating data and further the limitations of sensors and embedded systems in an ADS-equipped vehicle, providing good enough quality labelled data on edge is challenging. Furthermore, not having good enough quality data to update local models in a federated learning solution, may negatively affect—or even ruin—a global learned model.

SUMMARY OF THE INVENTION

It is therefore an object of embodiments herein to provide an approach for in an on edge-based manner training a supervised or semi-supervised perception model on edge of a vehicle equipped with an ADS, in an improved and/or alternative manner.

The object above may be achieved by the subject-matter disclosed herein. Embodiments are set forth in the appended claims, in the following description and in the drawings.

The disclosed subject-matter relates to a method performed by an annotation handling system for in an on edge-based manner training a supervised or semi-supervised perception model on edge of a vehicle equipped with an ADS. The annotation handling system stores while the vehicle is being driven, sensor data obtained from a set of onboard surrounding detecting sensors. The annotation handling system further selects based on selection criteria, annotation-eligible data out of the sensor data. Moreover, the annotation handling system generates a learning model candidate by annotating an event comprised in the annotation-eligible data, using a perception learning model. Furthermore, the annotation handling system generates at least a first corroboration candidate by annotating the event based on perception predictions of the event derived from radar- and/or lidar-based sensor data of the obtained sensor data and/or based on identifying the event in a digital map. The annotation handling system further determines, when one or more of the at least first corroboration candidate match the learning model candidate to an extent fulfilling predeterminable corroboration criteria, an annotation of the event, which annotation is based on both the learning model candidate and the one or more at least first corroboration candidate. Moreover, the annotation handling system updates the perception model based on the annotation.

The disclosed subject-matter further relates to an annotation handling system for—and/or adapted and/or configured for—in an on edge-based manner training a supervised or semi-supervised perception model on edge of a vehicle equipped with an ADS. The annotation handling system comprises a sensor data storing unit for storing while the vehicle is being driven, sensor data obtained from a set of onboard surrounding detecting sensors. The annotation handling system further comprises a data selecting unit for selecting based on selection criteria, annotation-eligible data out of the sensor data. Moreover, the annotation handling system comprises a model candidate generating unit for generating a learning model candidate by annotating an event comprised in the annotation-eligible data, using a perception learning model. Furthermore, the annotation handling system comprises a corroboration candidate generating unit for generating at least a first corroboration candidate by annotating the event based on perception predictions of the event derived from radar- and/or lidar-based sensor data of the obtained sensor data and/or based on identifying the event in a digital map. The annotation handling system further comprises an annotation determining unit for determining when one or more of the at least first corroboration candidate match the learning model candidate to an extent fulfilling predeterminable corroboration criteria, an annotation of the event, which annotation is based on both the learning model candidate and the one or more at least first corroboration candidate. Moreover, the annotation handling system comprises a perception model updating unit for updating the perception model based on said annotation.

Furthermore, the disclosed subject-matter relates to a vehicle comprising an annotation handling system as described herein.

Moreover, the disclosed subject-matter relates to a computer program product comprising a computer program containing computer program code means arranged to cause a computer or a processor to execute the steps of the annotation handling system described herein, stored on a computer-readable medium or a carrier wave. The disclosed subject-matter further relates to a non-volatile computer readable storage medium having stored thereon said computer program product.

Thereby, there is introduced an approach enabling data on edge of a vehicle to be annotated with sufficient quality in an automated and efficient manner, and a perception model on edge of said vehicle to subsequently be updated based thereon. That is, since there is stored while the vehicle is being driven sensor data obtained from a set of onboard surrounding detecting sensors, data indicative of the surrounding environment of the vehicle derived from surrounding detecting sensors such as one or more cameras, radars and/or lidars, is continuously and/or intermittently—e.g. during a predeterminable time period—collected onboard the vehicle. Furthermore, that is, since there is selected based on selection criteria annotation-eligible data out of the sensor data, data deemed suitable and/or relevant for subsequent annotation is filtered out from the sensor data, for instance by running quality checks and/or applying curation methods on the sensor data. Moreover, that is, since there is generated a learning model candidate by annotating an event comprised in the annotation-eligible data using a perception learning model, there is produced in an automated manner a perception learning model-based annotation of an event— such as an annotation of at least a portion of an object e.g. in an image—by annotating said event utilizing a—e.g. high-capacity—perception learning model on edge of the vehicle. Furthermore, that is, since there is generated at least a first corroboration candidate by annotating the event based on perception predictions of the event derived from radar- and/or lidar-based sensor data of the obtained sensor data and/or based on identifying the event in a digital map, there is additionally produced in an automated manner, as a complement to the perception learning model-based annotation of the event, one or more radar- and/or lidar-based annotations of at least a portion of said event utilizing perception predictions based—at least partly—on sensor data emanating from one or more onboard radars and/or lidars, and/or additionally produced one or more digital map-based annotations of at least a portion of the event by finding a match of said event in at least a first digital map. Accordingly, plural annotation candidates of the—at least partly—same event are generated on edge of the vehicle, based on at least partly differing input data and/or using at least partly differing models and/or methods for annotating. Moreover, that is, since there is determined, when one or more of the at least first corroboration candidate match the learning model candidate to an extent fulfilling predeterminable corroboration criteria, an annotation of the event, which annotation is based on both the learning model candidate and the one or more at least first corroboration candidate, the perception learning model-based annotation and at least a first of the radar-, lidar- and/or digital map-based annotations are combined, provided they coincide to a predeterminable extent, in a manner providing a corroborated and/or fused annotation of the event. Accordingly, a verified and/or fused annotation of the event may be determined on edge of the vehicle, in an automated and efficient manner. Thus, the introduced concept enables for data on edge of a vehicle to be annotated with sufficient quality, without—as commonly known in the art—necessitate involvement of and/or interaction with humans, such as e.g. human annotators involved in interactive image labelling. Furthermore, that is, since the perception model is updated based on the annotation, a verified and/or corroborated annotation of an event may be used as input for training of the perception model residing on the vehicle. Accordingly, with the introduced concept, there is enabled efficient supervised and/or semi-supervised learning on edge of a vehicle, in a real-world federated learning scheme.

For that reason, an approach is provided for in an on edge-based manner training a supervised or semi-supervised perception model on edge of a vehicle equipped with an ADS, in an improved and/or alternative manner.

BRIEF DESCRIPTION OF THE DRAWINGS

The various aspects of the non-limiting embodiments, including particular features and advantages, will be readily understood from the following detailed description and the accompanying drawings, in which.

DETAILED DESCRIPTION

Non-limiting embodiments of the present disclosure will now be described more fully hereinafter with reference to the accompanying drawings, in which currently preferred embodiments of the disclosure are shown. This disclosure may, however, be embodied in many different forms and should not be construed as limited to the embodiments set forth herein. Like reference characters refer to like elements throughout. Dashed lines of some boxes in the figures indicate that these units or actions are optional and not mandatory.

In the following, according to embodiments herein which relate to in an on edge-based manner training a supervised or semi-supervised perception model on edge of a vehicle equipped with an ADS, there will be disclosed an approach enabling data on edge of a vehicle to be annotated with sufficient quality in an automated and efficient manner, and a perception model on edge of said vehicle to subsequently be updated based thereon.

Figure 1:
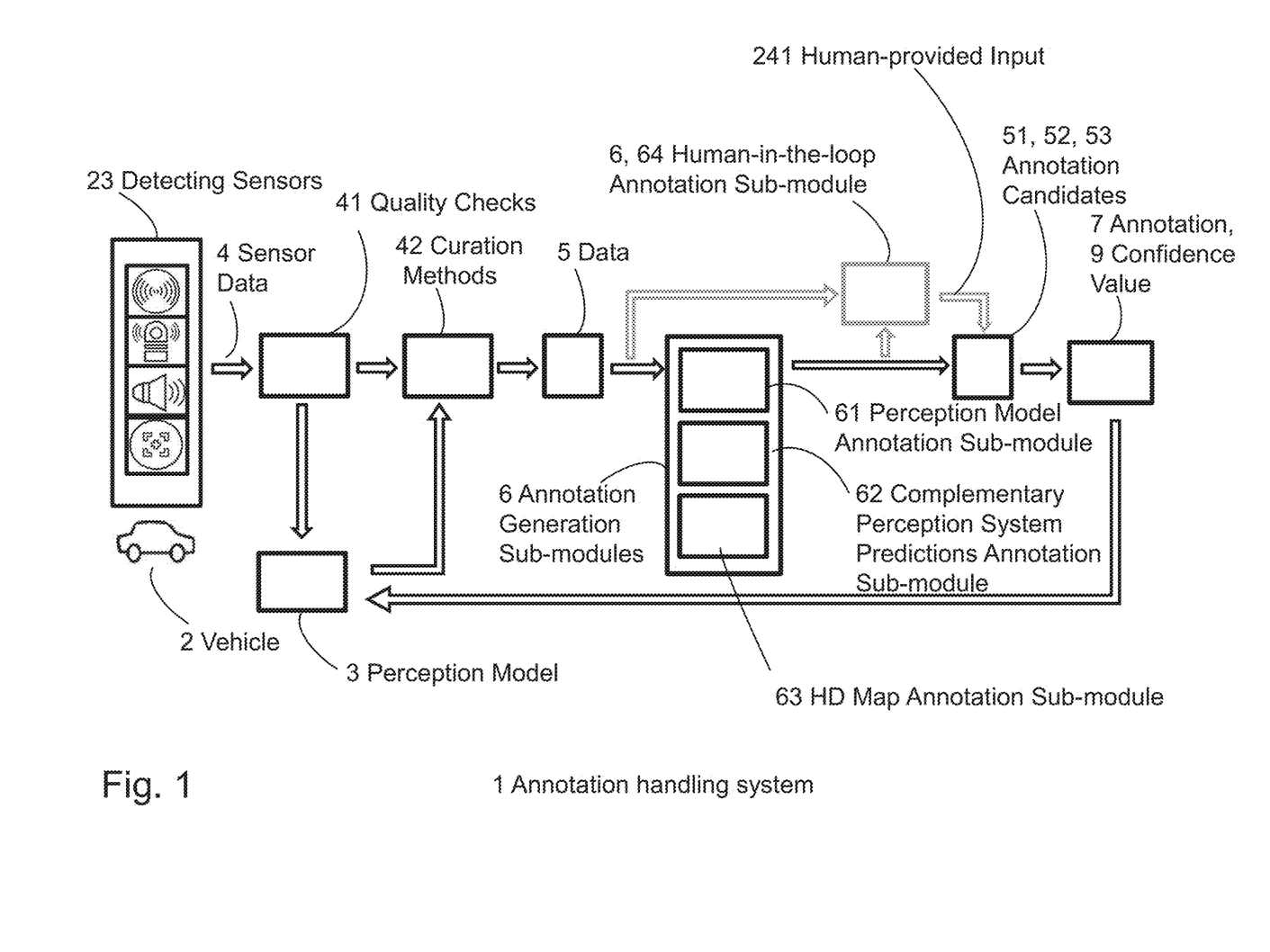
FIG. 1 illustrates a schematic view of an exemplifying annotation handling system according to embodiments of the disclosure.
Figure 2:
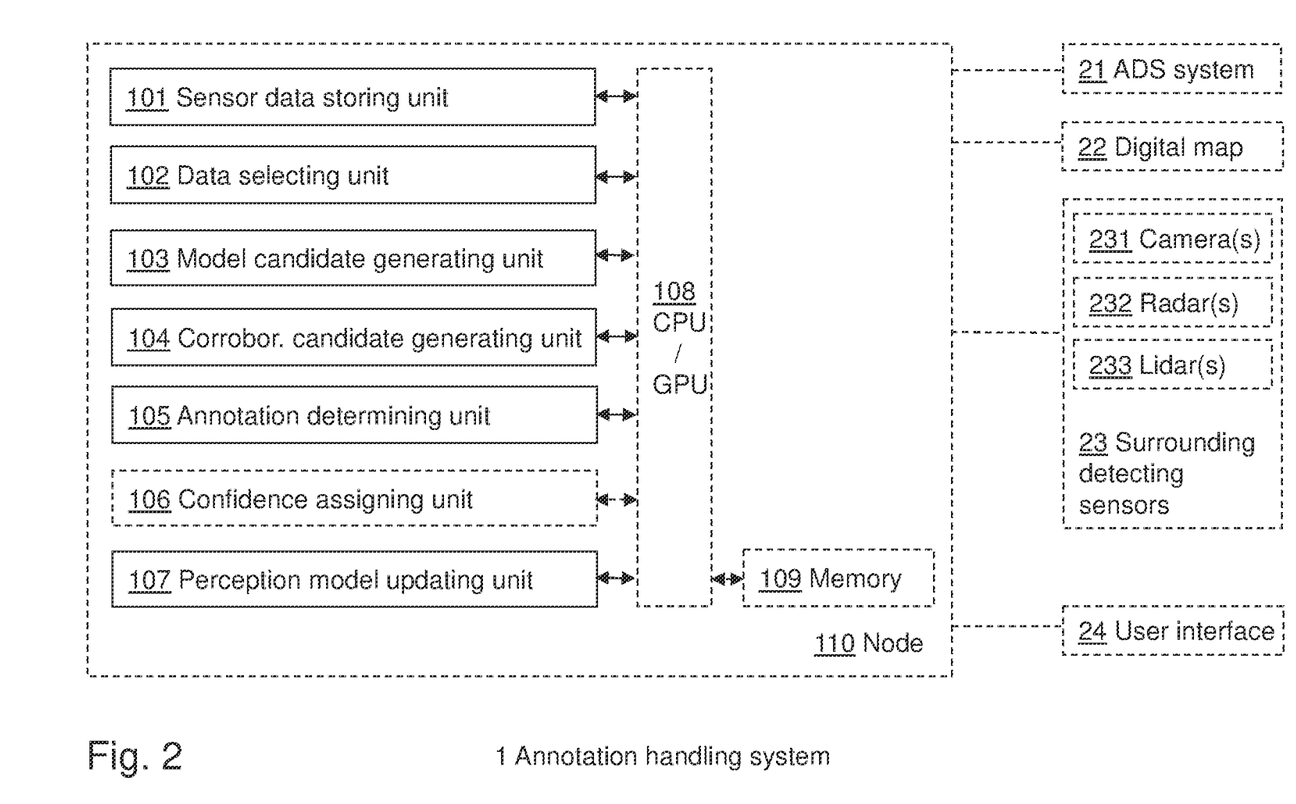
FIG. 2 is a schematic block diagram illustrating an exemplifying annotation handling system according to embodiments of the disclosure.

Referring now to the figures, there is depicted in FIG. 1 a schematic view and in FIG. 2 a schematic block diagram of an exemplifying annotation handling system 1 according to embodiments of the disclosure. The annotation handling system 1 is adapted for in an on edge-based manner training a supervised or semi-supervised perception model 3 on edge of a vehicle 2 equipped with an ADS 21.

The vehicle 2—which may be referred to as host vehicle or ego-vehicle—may be represented by any arbitrary—e.g. known—manned or unmanned vehicle, for instance an engine-propelled or electrically-powered vehicle such as a car, truck, lorry, van, bus and/or tractor. Moreover, the term "vehicle" may refer to "autonomous and/or at least partly autonomous vehicle", "driverless and/or at least partly driverless vehicle", and/or "self-driving and/or at least partly self-driving vehicle", and according to an example further to "production vehicle". Moreover, the ADS 21 on-board the vehicle 2 may be represented by any arbitrary ADAS or AD system e.g. known in the art and/or yet to be developed. Moreover, the vehicle 2 and/or ADS 21 may comprise, be provided with and/or have onboard a perception module and/or system (not shown) adapted to estimate surroundings of the vehicle 2, and subsequently adapted to estimate world views of the surroundings e.g. with support from a—e.g. commonly known—digital map 22 such as a high definition, HD, map, and/or an equivalent and/or successor thereof. The perception module may refer to any commonly known system and/or functionality, e.g. comprised in one or more electronic control modules, ECUs, and/or nodes of the vehicle 2 and/or the ADS 21, adapted and/or configured to interpret sensory information—relevant for driving of the vehicle 2—to identify e.g. objects, obstacles, vehicle lanes, relevant signage, appropriate navigation paths etc. The perception module—which may be adapted to support e.g. sensor fusion, tracking, localization etc.—may thus be adapted to rely on sensory information. Such exemplifying sensory information may, for instance, be derived from one or more—e.g. commonly known—sensors comprised in and/or provided onboard the vehicle 2 adapted to sense and/or perceive the vehicle's 2 whereabouts and/or surroundings, for instance represented by one or a combination of one or more of surrounding detecting sensors 23, such as image capturing devices e.g. camera(s) 231, radar(s) 232, lidar(s) 233, ultrasonics etc., and/or a positioning system, odometer, inertial measurement units etc. In other words, a perception module is in the present context thus to be understood as a system responsible for acquiring raw sensor data from on-board sensors, such as camera(s) 231, lidar(s) 232 and radar(s) 233, ultrasonic sensors etc., and converting this raw data into scene understanding. The perception model 3, on the other hand, may be represented by any feasible ML, DL and/or AI perception model running—and/or intended to run—in real-time on the vehicle 2, in association with—and/or intended for—a perception module of an ADS 21 thereof. The phrase "annotation handling system" may refer to "annotation computing system" and/or "assessment system", and according to an example further to "annotation fusing and confidence assigning system", whereas "a method performed by an annotation handling system" may refer to "an at least partly computer-implemented method performed by an annotation handling system". Moreover, "for in an on edge-based manner" may refer to "for with an on edge-based approach", and according to an example further to "for in a federated learning-based manner", whereas "training a supervised or semi-supervised perception model" may refer to "training a supervised or semi-supervised perception model", "teaching a supervised or semi-supervised perception model", "training a perception model" and/or "training a ML, DL and/or AI perception model". According to an example, "perception model" may refer to ""vision perception model". The phrase "on edge of a vehicle", on the other hand, may refer to "onboard and/or residing on a vehicle" and/or "intended to run in real-time in a vehicle".

As illustrated in an exemplifying manner in exemplifying FIGS. 1-2, the annotation handling system 1 is—e.g. by means of a sensor data storing unit 101—adapted and/or configured for storing while the vehicle 2 is being driven, sensor data 4 obtained from a set of onboard surrounding detecting sensors 23. Thereby, data 4 indicative of the surrounding environment of the vehicle 2 derived from surrounding detecting sensors 23 such as one or more cameras 231, radars 232 and/or lidars 233, is continuously and/or intermittently—e.g. during a predeterminable time period—collected onboard the vehicle 2.

The sensor data 4 may be stored in any arbitrary feasible manner, such as in one or more data buffers e.g. ring buffers, of any feasible size(s) and/or dimension(s). The set of onboard surrounding detecting sensors 23, on the other hand, may be represented by any arbitrary feasible number and/or combination of onboard sensors adapted to capture vehicle surroundings—such as those mentioned in conjunction with the perception module discussed above—and may for instance comprise a combination of camera(s) 231, radar(s) 232 and/or lidar(s) 233. The phrase "storing [ . . . ] sensor data" may refer to "storing continuously and/or intermittently [ . . . ] sensor data", "storing during a predeterminable time period [ . . . ] sensor data", "storing onboard said vehicle e.g. in one or more data buffers such as ring data buffers [ . . . ] sensor data" and/or "collecting, buffering and/or logging [ . . . ] sensor data", whereas "sensor data obtained from a set of onboard surrounding detecting sensors" may refer to "sensor data indicative of a surrounding environment of said vehicle obtained from a set of onboard surrounding detecting sensors", "a set of sensor data obtained from a set of onboard surrounding detecting sensors", "sensor data obtained with support from and/or utilizing a set of onboard surrounding detecting sensors", "sensor data obtained from two or more onboard surrounding detecting sensors" and/or "sensor data obtained from onboard surrounding detecting sensors of two or more different modalities". According to an example, "sensor data obtained from a set of onboard surrounding detecting sensors" may further refer to "sensor data obtained from a set of onboard surrounding detecting sensors, the obtained sensor data comprising camera-based sensor data obtained from at least a first onboard camera and further radar-based sensor data obtained from at least a first onboard radar and/or lidar-based sensor data obtained from at least a first onboard lidar". Furthermore, according to an example, "sensor data" may refer to "perception data". The phrase "while said vehicle is being driven", on the other hand, may refer to "as said vehicle is being driven" and/or "during a driving session of said vehicle".

As illustrated in an exemplifying manner in exemplifying FIGS. 1-2, the annotation handling system 1 is further—e.g. by means of a data selecting unit 102—adapted and/or configured for selecting based on selection criteria, annotation-eligible data 5 out of the sensor data 4. Thereby, data 5 deemed suitable and/or relevant for subsequent annotation is filtered out from the sensor data 4, for instance by running quality checks 41 and/or applying curation methods 42 on the sensor data 4.

Such—e.g. known—quality checks 41 may for instance include automatic checks that are run to make sure the quality of the collected data 4 is good enough, e.g. that no faulty sensor is detected or that no logging issue or such is detected. The quality checks 41 may for instance be sensor-related anomaly detection algorithms or fault prediction algorithms or some logical checks on the values of the logged data 4 considering prior knowledge about the sensor specifications, and so forth. Curation methods 42, on the other hand, may for instance include—e.g. known—methods such as efficient sampling e.g. selecting frames based on time or space distance between them, query- and/or filter-based approaches e.g. mining data based on a specific condition like having high accident probability or animals in images etc., intelligent curation methods such as active learning e.g. finding samples that current model 3 has a low prediction performance for them, and so forth. The selection criteria may accordingly relate to and/or comprise any arbitrary feasible predeterminable rules for filtering out data 5 considered eligible for subsequent annotation. The annotation-eligible data 5 may be of any arbitrary feasible format and/or size, and furthermore stored and/or retained in any arbitrary manner such as in one or more buffers, e.g. referred to as annotation-eligible data buffers. The phrase "selecting based on selection criteria" may refer to "buffering based on selection criteria", "filtering out based on selection criteria", "selecting by applying selection criteria", "selecting based on predeterminable selection criteria" and/or "selecting from running quality checks e.g. sensor quality checks and/or curation", whereas "annotation-eligible data" may refer to "annotation-suitable data", "data deemed eligible for subsequent annotation" and/or "curated data".

As illustrated in an exemplifying manner in exemplifying FIGS. 1-2, the annotation handling system 1 is further—e.g. by means of a model candidate generating unit 103—adapted and/or configured for generating a learning model candidate 51 by annotating an event comprised in the annotation-eligible data 5, using a perception learning model. Thereby, there is produced in an automated manner a perception learning model-based annotation 51 of an event—such as an annotation 51 of at least a portion of an object e.g. in an image—by annotating said event utilizing a—e.g. high-capacity—perception learning model on edge of the vehicle 2. That is, the perception model 3 intended to run in real-time on the vehicle 2 commonly has a limited precision—e.g. int8 for its weights—and/or number of parameters, since said perception model 3 is intended to run in real-time on the vehicle 2 together with other modules of the ADS 21, on a limited HW. For generating perception model-based annotations 51, however, there may be used one or more higher-precision—e.g. float32 weights—or higher-capacity networks e.g. using more parameters and/or recurrent NNs commonly having higher inference time not affordable in real-time.

The event may be represented by any arbitrary—e.g. at least camera-based—subset of the annotation-eligible data 5 such as at least a portion of a dynamic and/or static object, polygon, semantic area, etc., and for instance be represented by—at least a portion of—another vehicle, other traffic participants such as e.g. pedestrian(s) and/or bicyclist(s), solid or dashed lane marking, stop line, crosswalk, sidewalk, traffic light, arrow and/or pole, etc. Furthermore, the event may be annotated using at least a first perception learning model on edge in the vehicle 2, in any feasible—e.g. known—manner, for instance utilizing—out of exemplifying plural annotation generation sub-modules 6—an exemplifying perception model annotation sub-module 61. The perception learning model may for instance be represented by a high- or higher-capacity—and/or high- or higher-precision—ML, DL and/o AI perception model, e.g. vision perception model. According to an example, and as illustrated in an exemplifying manner in FIGS. 4 and 5 top of page ("High-capacity ML/DL-based perception Model 1/2/3"), the learning model candidate 51—i.e. the perception learning model-based annotation 51 of the event—may be generated by fusing and/or combining input from differing object detection models, such as Faster RCNN, YOLO, and/or RetinaNet etc., which for instance may be comprised in differing perception learning models on edge of the vehicle 2. Moreover, for each event to be annotated, there may be buffered—e.g. in the exemplifying annotation-eligible data buffer(s)—timeseries starting before and/or ending after the event. Information in adjacent frames can be used to improve annotation generation in the target frame through filtering, consistency enforcement, use of recurrent models and such, and furthermore, signal sources not to be annotated but supporting the automation may also be buffered. Thus, to improve the quality of the learning model candidate 51, non-causal tracking of predictions before and after the desired frame can be used, e.g. as known in the art. In other words, information in adjacent frames available in the buffered data can be used to improve the quality of the annotation generation in the target frame through filtering and smoothing e.g. by means of Kalman filter, particle filter, Fixed-lag smoother etc., through consistency enforcement e.g., Spatio-temporal consistency loss e.g. using IMPU/GPS information, through use of recurrent/temporal models e.g. transformers, recurrent neural networks like LSTM, etc. The phrase "generating a learning model candidate" may refer to "producing a learning model candidate", and according to an example further to "generating, e.g. by means of a perception model annotation sub-module, a learning model candidate", "generating, e.g. by means of a ML/DL-based perception model annotation sub-module, a learning model candidate", "generating, e.g. by means of a high-capacity perception model annotation sub-module, a learning model candidate" and/or "generating, e.g. by means of vision perception model annotation sub-module, a learning model candidate". Moreover, "generating a learning model candidate" may refer to "generating a learning model annotation candidate", "generating a perception model-based annotation" and/or "generating a learning model-based annotation". The phrase "event comprised in said annotation-eligible data", on the other hand, may refer to "subset comprised in said annotation-eligible data" and/or "event—e.g. at least a portion of an object, polygon and/or semantic area—comprised in said annotation-eligible data", whereas "using a perception learning model" may refer to "using at least a first perception learning model", "using predictions of a perception learning model" and/or "by means of a perception learning model". According to an example, "using a perception learning model" may further refer to "using a perception learning model, with support from one or more object detection models, e.g. Faster RCNN, YOLO, RetinaNet etc." and/or "using a perception learning model, with support from one or more other perception learning models using differing object detection models". Moreover, "perception learning model" may refer to "perception learning model on edge of said vehicle", "ML, DL and/or AI perception learning model, and/or "high- or higher-capacity and/or high- or higher-precision ML/DL perception learning model", and according to an example further to "high-capacity vision ML/DL-based perception learning model".

As illustrated in an exemplifying manner in exemplifying FIGS. 1-2, the annotation handling system 1 is further—e.g. by means of a corroboration candidate generating unit 104—adapted and/or configured for generating at least a first corroboration candidate 52, 53 by annotating the event based on perception predictions of the event derived from radar- and/or lidar-based sensor data of the obtained sensor data 4 and/or based on identifying the event in a digital map 22. Thereby, as a complement to the perception learning model-based annotation 51 of the event, there is additionally produced in an automated manner one or more radar- and/or lidar-based annotations 52 of at least a portion of said event utilizing perception predictions based—at least partly—on sensor data emanating from one or more onboard radars 232 and/or lidars 233, and/or additionally produced one or more digital map-based annotations 53 of at least a portion of the event by finding a match of said event in at least a first digital map 22. Accordingly, plural annotation candidates 51, 52, 53 of—at least partly—the same event are generated on edge of the vehicle 2, based on at least partly differing input data and/or using at least partly differing models and/or methods for annotating.

Figure 4:
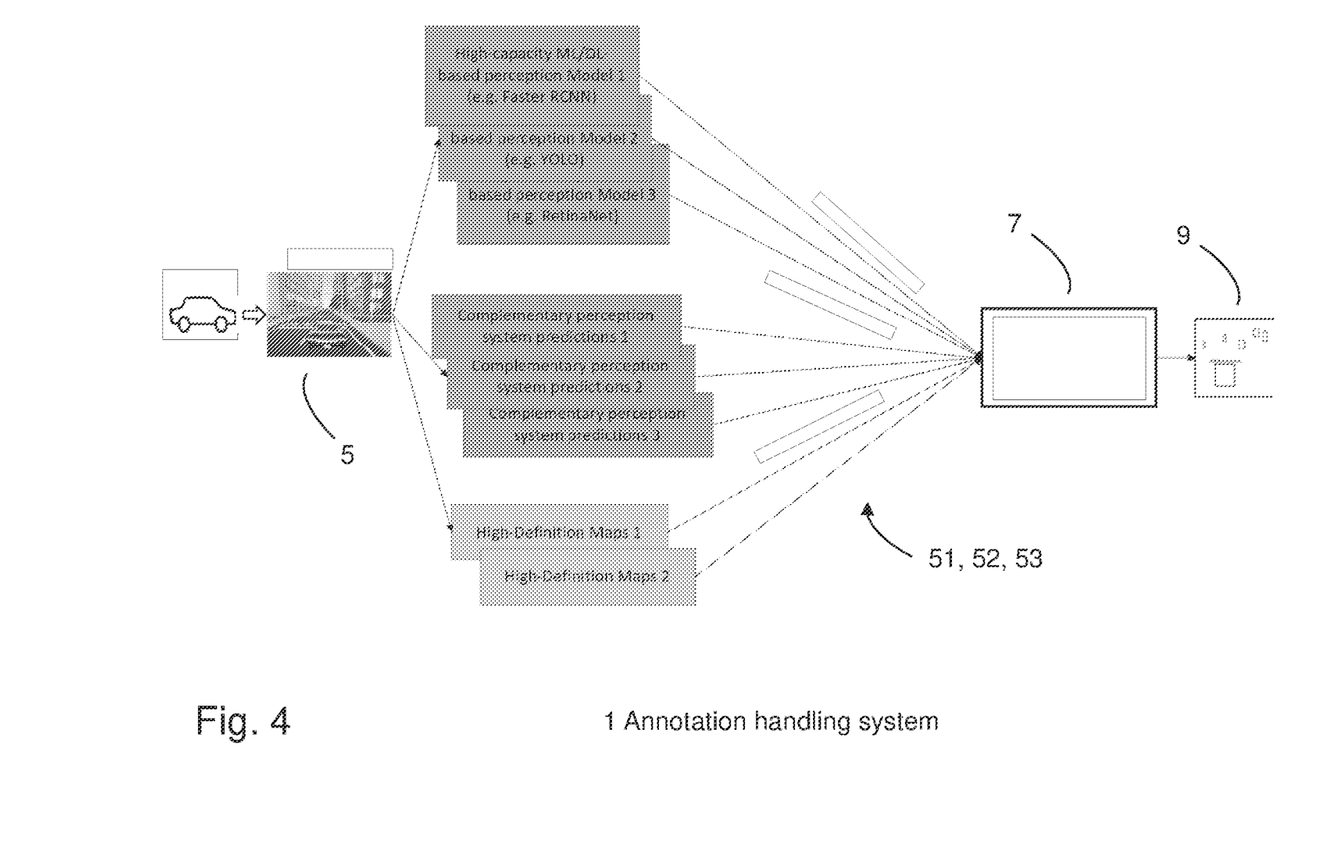
FIG. 4 illustrates a schematic view of an exemplifying annotation process of an exemplifying annotation handling system according to embodiments of the disclosure.

The event—or at least a portion thereof—may, as illustrated in an exemplifying manner in FIG. 4 mid-page ("Complementary perception system predictions 1/2/3"), be annotated based on perception predictions thereof derived from at least radar- and/or lidar-based sensor data of the buffered sensor data 4, in any feasible—e.g. known—manner, for instance utilizing—out of the exemplifying plural annotation generation sub-modules 6—an exemplifying complementary perception system predictions annotation sub-module 62. Potential annotation candidates 52 of the event may accordingly be generated based on data derived at least from one or more onboard radars 232 and/or lidars 233, and for instance additionally based on data from further sensors of differing modality. Similarly, the event—or at least a portion thereof—may, as illustrated in an exemplifying manner in FIG. 4 bottom of page ("High-Definition Maps 1/2"), be annotated based on identifying the event in at least a first digital map 22, in any feasible—e.g. known—manner, for instance utilizing—out of the exemplifying plural annotation generation sub-modules 6—an exemplifying HD map annotation sub-module 63. Potential annotation candidates 53 of the event may accordingly be generated based on data—such as e.g. a road, lane, sign etc.—identified in at least one or more—e.g. onboard—digital maps 22, and for instance additionally based on data from further sensors. Digital map-based corroboration candidates 53 may for instance be better suited for events represented by static—rather than dynamic—objects, and furthermore, the digital map(s) 22 may for instance be represented by any arbitrary feasible—e.g. known—digital map(s) such as HD map(s) or equivalent(s) or successor(s) thereof. Other potential corroboration sources—not further described in detail herein—may relate to V2X and Digital Twins, which may work well e.g. for dynamic objects. According to an example, and as illustrated in an exemplifying manner in FIG. 5, the one or more corroboration candidates 52, 53 may be generated by fusing and/or combining input from differing sensors 23 and/or digital maps 22. Accordingly, input from multiple sensor modalities 231, 232, 233 may potentially be fused to generate higher-quality corroboration candidates 52, or generated corroboration candidates 52 from different sensor modalities 231, 232, 233 may be subsequently fused using different sensor fusion algorithms e.g., Kalman filter, particle filter, Bayesian filtering and/or neural networks etc. to improve the quality of the corroboration candidates 52. To improve the quality of the corroboration candidate(s) 52, 53 such as potential radar- and/or lidar-based corroboration candidate(s) 52, non-causal tracking of predictions before and after the desired frame can be used, e.g. as known in the art. In other words, information in adjacent frames available in the buffered data can be used to improve the quality of the annotation generation in the target frame through filtering and smoothing e.g. by means of Kalman filter, particle filter, Fixed-lag smoother etc., through consistency enforcement e.g., Spatio-temporal consistency loss e.g. using IMPU/GPS information, through use of recurrent/temporal models e.g. transformers, recurrent neural networks like LSTM, etc. The phrase "generating at least a first corroboration candidate" may refer to "producing at least a first corroboration candidate" and/or "generating at least a first potential corroboration candidate", and according to an example further to "generating, e.g. by means of a complementary perception system predictions annotation sub-module, at least a first corroboration candidate. Moreover, "generating at least a first corroboration candidate" may refer to "generating at least a first corroboration annotation candidate". The phrase "annotating the event" may refer to "annotating at least a portion of the event" and/or "annotating the presumed same event", whereas "based on perception predictions of said event derived from radar- and/or lidar-based sensor data of said obtained sensor data" may refer to "based on radar- and/or lidar-based sensor data of said event in said obtained sensor data". Moreover, "derived from radar- and/or lidar-based sensor data" may refer to "derived from at least radar- and/or lidar-based sensor data", whereas "radar and/or lidar-based sensor data of said obtained sensor data" may refer to "radar- and/or lidar-based sensor data of the annotation-eligible data of said obtained sensor data" and/or "radar-based sensor data and/or lidar-based sensor data of said obtained sensor data". The phrase "based on identifying said event in a digital map", on the other hand, may refer to "based on identifying at least a portion of said event in a digital map", "based on at least identifying said event in a digital map" and/or "based on identifying said event in at least a first digital map". According to an example, the phrase "generating at least a first corroboration candidate by annotating the event based on [ . . . ]" may refer to "generating at least first corroboration candidate by annotating the event based on [ . . . ] and/or using at least a first complementary perception learning model on edge of the vehicle comprising a different object detection model than said perception learning model".

As illustrated in an exemplifying manner in exemplifying FIGS. 1-2, the annotation handling system 1 is further—e.g. by means of an annotation determining unit 105—adapted and/or configured for determining, when one or more of the at least first corroboration candidate 52, 53 match the learning model candidate 51 to an extent fulfilling predeterminable corroboration criteria, an annotation 7 of the event, which annotation 7 is based on both the learning model candidate 51 and the one or more at least first corroboration candidate 52, 53. Thereby, provided the perception learning model-based annotation 51 and at least a first of the radar-, lidar- and/or digital map-based annotations 52, 53 coincide to a predeterminable extent, they are combined in a manner providing a corroborated and/or fused annotation 7 of the event. Accordingly, a verified and/or fused annotation 7 of the event may be determined on edge of the vehicle 2, in an automated and efficient manner. Thus, the introduced concept enables for data on edge of a vehicle to be annotated with sufficient quality, without—as commonly known in the art—necessitate involvement of and/or interaction with humans, such as e.g. human annotators involved in interactive image labelling.

The predeterminable corroboration criteria may be represented by any feasible conditions and/or rules stipulating under what condition(s) a corroboration candidate 52, 53 is deemed to sufficiently match the learning model candidate 51, such that it 52, 53 may verify the learning model candidate 51 and/or be fused therewith 51. The corroboration criteria may accordingly for instance relate to a required degree of overlap—such as degree of annotation overlap—between the learning model candidate 51 and the corroboration candidate(s) 52, 53. Furthermore, the corroboration candidate(s) 52, 53 fulfilling the corroboration criteria and the learning model candidate 51, may, respectively, contribute to—and/or provide input to—the resulting annotation 7, to any feasible degree. According to an example, the corroboration candidate(s) 52, 53 fill the role of corroborating and/or verifying the learning model candidate 51, i.e. the radar-, lidar- and/or digital map-based annotation(s) 52, 53 may—provided said annotation(s) 52, 53 fulfill the corroboration criteria—contribute to the resulting annotation 7 by corroborating and/or verifying the annotation 51 generated by the perception learning model. In such a case, the resulting annotation 7 may potentially be represented fully—or to the greatest extent—by the learning model candidate 51. Optionally, however, determining the annotation 7 of the event may comprise—and/or the annotation determining unit 101 may be adapted and/or configured for—fusing the learning model candidate 51 and the one or more at least first corroboration candidate 52, 53 in accordance with predeterminable fusion criteria stipulating conditions for combining said learning model candidate 51 and said one or more at least first corroboration candidate 52, 53. Such fusion criteria may for instance comprise conditions and/or rules for to what respective degree the corroboration candidate(s) 52, 53 fulfilling the corroboration criteria and the learning model candidate 51, respectively, should contribute to—and/or provide input to—the resulting annotation 7. The annotation candidates 51, 52, 53 may for instance—as illustrated in exemplifying FIG. 5—be attributed with a respective confidence value 8, as known in the art, indicating confidence associated with respective annotation 51, 52, 53. That is, commonly, DL/ML-based perception models provide probabilities or confidence values together with their predictions, showing how probable it is that a pixel or a bounding box belongs to a particular class and how confident the network is about the assignment; for instance, if it has high probabilities for two-classes, even when the network assigns a box to one of the classes, its confidence would be lower than when it has a high likelihood only for one class. A non-probabilistic ML/DL model, for instance, would lead to I/O annotation probabilities/confidence values. Accordingly, optionally, and as illustrated in exemplifying FIGS. 1-2, the annotation handling system 1 may further—e.g. by means of an optional confidence assigning unit 107—be adapted and/or configured for assigning the annotation 7 a confidence value 9 based on—as illustrated in exemplifying FIG. 5—aggregated and/or combined respective confidence values 8 associated with the learning model candidate 51 and corroboration candidate 52, 53 fulfilling the corroboration criteria, and/or based on the extent of the match with which the one or more of the corroboration candidates 52, 53 fulfill the corroboration criteria. Thus, overlapping annotation candidates 51, 52, 53 may be reinforced, i.e. the resulting annotation 7 may get a higher confidence 9, in being confirmed by plural annotation candidates 51, 52, 53. It may be noted that different annotated objects or polygons in for instance a single image, may have different confidence values; not all parts of said image necessarily get the same confidence value. Furthermore, according to an example, respective exemplifying perception model annotation sub-module 61, complementary perception system predictions annotation sub-module 62 and/or HD map annotation sub-module 63, may be attributed with a respective confidence and/or profile that may be updated over time upon evaluating respective module's 61, 62, 63 output against one another 61, 62, 63. Respective confidence and/or profile may then subsequently be taken into consideration in assigning a confidence value 9 to the resulting annotation 7 upon combining the annotation candidates 51, 52, 53, e.g. upon commonly known ensemble voting. The phrase "determining [ . . . ] an annotation of said event" may refer to "calculating [ . . . ] an annotation of said event", "determining [ . . . ] a resulting annotation of said event", "determining [ . . . ] a corroborated, confirmed, reinforced and/or verified annotation of said event" and/or "determining [ . . . ] a fused annotation of said event", whereas "when one or more of said at least first corroboration candidate match" may refer to "provided one or more of said at least first corroboration candidate match". The phrase "match said learning model candidate", on the other hand, may refer to "coincide with and or overlap said learning model candidate", whereas "to an extent fulfilling predeterminable corroboration criteria" may refer to "to a degree and/or level fulfilling predeterminable corroboration criteria", "at least to a predeterminable extent", "to an extent exceeding a predeterminable minimum threshold" and/or "to an extent fulfilling predeterminable corroboration criteria stipulating conditions for minimum degree of annotation overlap". Moreover, "which annotation is based on both said learning model candidate and said one or more at least first corroboration candidate" may refer to "which annotation is based on input from both said learning model candidate and said one or more at least first corroboration candidate", "which annotation takes into account both said learning model candidate and said one or more at least first corroboration candidate" and/or "which annotation is calculated and/or derived from at least a portion of said learning model candidate and at least a portion of said one or more at least first corroboration candidate". According to an example, the phrase "determining when one or more of said at least first corroboration candidate match said learning model candidate to an extent fulfilling predeterminable corroboration criteria, an annotation of said event, which annotation is based on both said learning model candidate and said one or more at least first corroboration candidate" may refer to "determining an annotation of said event based on said learning model candidate in combination with corroboration candidates matching said learning model candidate to an extent fulfilling predeterminable corroboration criteria".

As illustrated in an exemplifying manner in exemplifying FIGS. 1-2, the annotation handling system 1 is further—e.g. by means of a perception model updating unit 107—adapted and/or configured for updating the perception model 3 based on the annotation 7. Thereby, a verified and/or corroborated annotation 7 of an event may be used as input for training of the perception model 3 residing on the vehicle 2. Accordingly, with the introduced concept, there is enabled efficient supervised and/or semi-supervised learning on edge of a vehicle, in a real-world federated learning scheme. The perception model 3 may be updated in any feasible manner, at any point in time deemed relevant and/or suitable. The phrase "updating said perception model based on said annotation" may refer to "enabling said annotation to be used in training of said perception model" and/or "updating said perception model with said annotation".

Optionally, should a confidence value 9 have been assigned the resulting annotation 7 of the event, updating the perception model 3 may comprise—and/or the perception model updating unit 107 may be adapted and/or configured for—updating the perception model 3 based on the annotation 7, provided the confidence value 9 fulfils predeterminable confidence criteria. Thereby, the annotation 7 is only used for training of the perception model 3 when the confidence value 9 associated therewith comply with confidence conditions. Accordingly, the perception model 3 is not updated with and/or based on annotations not fulfilling the confidence criteria, thus inhibiting such non-fulfilling annotations to impact training of the perception model 3. The confidence criteria may refer to any arbitrary feasible conditions and/or levels in view of confidence of an annotation, and for instance stipulate a minimum confidence threshold. The phrase "updating [ . . . ] provided said confidence value fulfils" may refer to "updating [ . . . ] when said confidence value fulfils", whereas "fulfils predeterminable confidence criteria" may refer to "fulfils adjustable predeterminable confidence criteria" and/or "exceeds a predeterminable minimum confidence level".

Optionally, the generating of a learning model candidate 51 and/or generating of at least a first corroboration candidate 52, 53, may be enabled provided the vehicle 2 not being driven. Thereby, generation of the perception learning model-based annotation 51 and/or the radar-, lidar- and/or digital map-based annotation(s) 52, 53 may be carried out once the vehicle 2 is no longer being driven, such as e.g. being idle and/or being in an idle mode, which in turn may support high-capacity data handling. The vehicle 2 being idle and/or being in an idle mode may for instance be represented by said vehicle 2 having enough secured computational resources and/or power without negatively impacting a potential vehicle occupant's experience, for instance being connected to a charging station and/or not being in use, further for instance being connected to a high-speed network, e.g. through Wi-Fi and/or via cable. The phrase "provided said vehicle not being driven" may refer to "provided determining said vehicle not—and/or no longer—being driven".

Moreover, optionally, and as illustrated in an exemplifying manner in exemplifying FIGS. 1-2, the generating of at least a first corroboration candidate 52, 53 may comprise generating at least a first corroboration candidate 52, 53 by further annotating the event based on human-provided input 241 provided with support from a user interface 24 within the vehicle 2. Thereby, the event may additionally be annotated and/or verified by one or more vehicle occupants, in a—e.g. known—human-in-the-loop setup, where interaction related to annotations and/or data associated therewith may take place via the user interface 24. Such a human-in-the-loop setup may for instance be carried out utilizing—out of the exemplifying plural annotation generation sub-modules 6—an exemplifying human-in-the-loop annotation sub-module 64. The user interface 24, on the other hand, may be represented by any arbitrary feasible interface onboard the vehicle 2—e.g. integrated therewith and/or connected thereto e.g. via cable and/or wirelessly such as via e.g. Bluetooth—adapted and/or configured for interaction with a vehicle occupant in view of annotation handling. The user interface 24 may accordingly comprise e.g. one or more of at least a first touch display, speaker, microphone and/or eye tracking function and/or system etc., and may further e.g. potentially be comprised at least partly in a separate electronic device such as a smartphone, tablet, laptop etc. Further optionally, annotating the event based on human-provided input may be enabled provided each of a radar-, lidar- and/or digital map-based corroboration candidate fails to match the learning model candidate to an extent fulfilling the corroboration criteria. Thereby, the human-in-the loop setup for annotation is only enabled when respective corroboration candidate(s) 52, 53 does not fulfill the corroboration criteria of matching the learning model candidate 51 to a sufficient extent, whereupon corroboration of said learning model candidate 51 instead may need to be provided by a vehicle occupant. Prior to a vehicle occupant being allowed to participate in annotating via the user interface 24, a human annotator test scheme may potentially be carried out, to verify said vehicle occupant's capabilities in providing accurate annotations. Such a test scheme may for instance be represented by providing the vehicle occupant—prior to being allowed to participate in annotating via the user interface 24—with annotations that are known to be correct, for verifying that said vehicle occupant annotates correctly at least to a predeterminable extent and thus qualifies for providing sufficient annotations. The phrase "annotating the event based on human-provided input" may refer to "annotating at least a portion of the event based on human-provided input", and according to an example further to "corroborating and/or verifying a generated annotation of the event, such as the learning model candidate and/or one or more of the corroboration candidates, based on human-provided input". The phrase "user interface within said vehicle", on the other hand, may refer to "user interface associated with and/or comprised in said vehicle" and/or "user interface comprised in and/or connected to said vehicle".

As further shown in FIG. 2, the annotation handling system 1 comprises a sensor data storing unit 101, a data selecting unit 102, a model candidate generating unit 103, a corroboration candidate generating unit 104, an annotation determining unit 105, an optional confidence assigning unit 106 and a perception model updating unit 107, all of which already have been described in greater detail above. Furthermore, the embodiments herein for in an on edge-based manner training a supervised or semi-supervised perception model 3 on edge of a vehicle 2 equipped with an ADS 21, may be implemented through one or more processors, such as a processor 108, for instance represented by at least a first Central Processing Unit, CPU, at least a first Graphics Processing Unit, GPU, at least a first Tensor Processing Unit, TPU, and/or at least a first Field-Programmable Gate Array, FPGA, together with computer program code for performing the functions and actions of the embodiments herein. Said program code may also be provided as a computer program product, for instance in the form of a data carrier carrying computer program code for performing the embodiments herein when being loaded into the annotation handling system 1. One such carrier may be in the form of a CD/DVD ROM disc and/or a hard drive, it is however feasible with other data carriers. The computer program code may furthermore be provided as pure program code on a server and downloaded to the annotation handling system 1. The annotation handling system 1 may further comprise a memory 109 comprising one or more memory units. The memory 109 optionally includes high-speed random-access memory, such as DRAM, SRAM, DDR RAM, or other random access solid-state memory devices, and further optionally includes non-volatile memory, such as one or more magnetic disk storage devices, optical disk storage devices, flash memory devices, or other non-volatile solid-state storage devices. Moreover, the memory 109 may be arranged to be used to store e.g. information, and further to store data, configurations, scheduling, and applications, to perform the methods herein when being executed in the annotation handling system 1. For instance, the computer program code may be implemented in the firmware, stored in FLASH memory 109, of an embedded processor 108, and/or downloaded wirelessly e.g. from an off-board server. Furthermore, units 101-107, the optional processor 108 and/or the optional memory 109, may at least partly be comprised in one or more nodes 110 e.g. ECUs of the vehicle 2, e.g. in and/or in association with the ADS 21. Those skilled in the art will also appreciate that said units 101-107 described above as well as any other unit, interface, system, controller, module, device, element, feature, or the like described herein may refer to, comprise, include, and/or be implemented in or by a combination of analog and digital circuits, and/or one or more processors configured with software and/or firmware, e.g. stored in a memory such as the memory 109, that when executed by the one or more processors such as the processor 108 perform as described herein. One or more of these processors, as well as the other digital hardware, may be included in a single Application-Specific Integrated Circuitry, ASIC, or several processors and various digital hardware may be distributed among several separate components, whether individually packaged or assembled into a System-on-a-Chip, SoC.

Figure 3:
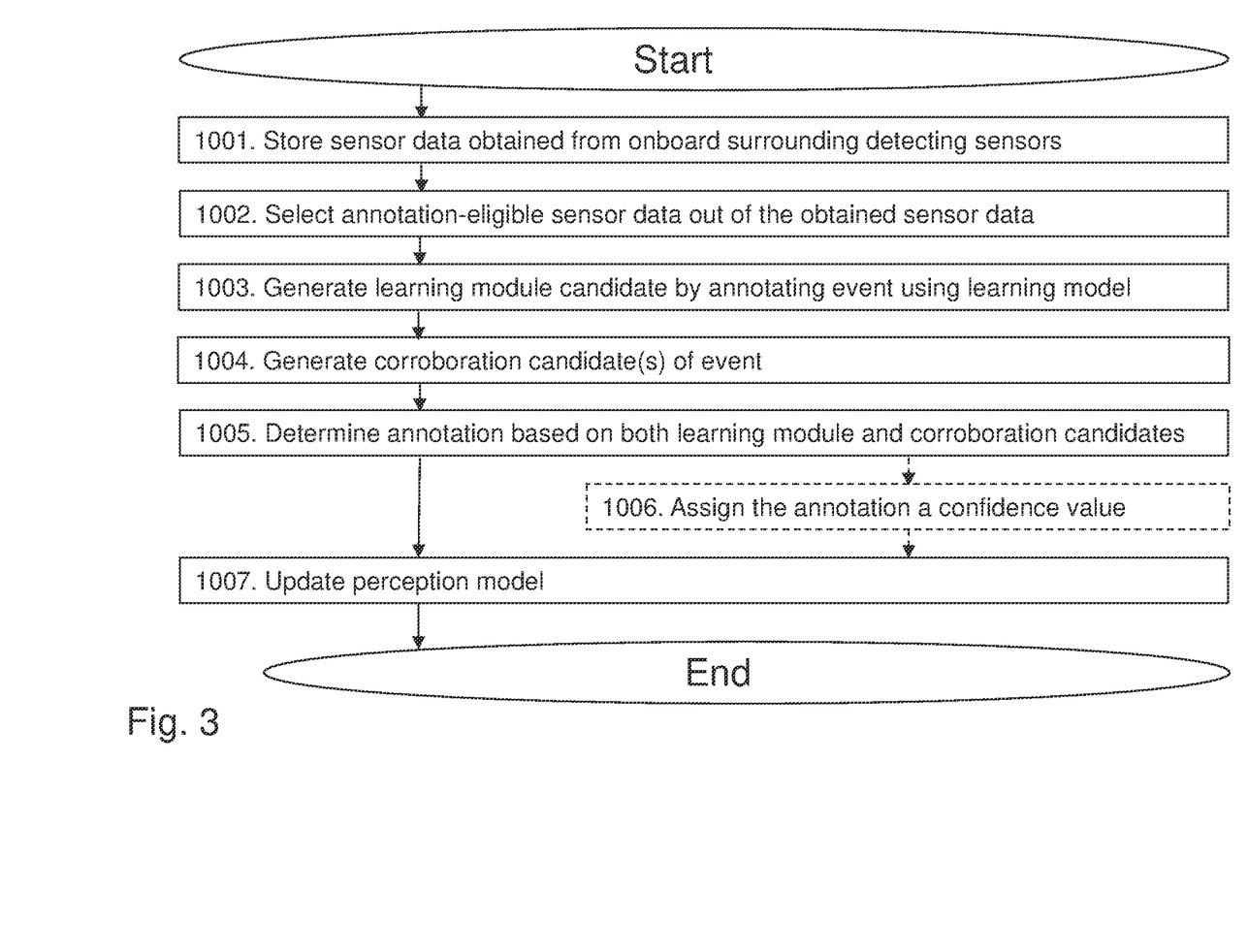
FIG. 3 is a flowchart depicting an exemplifying method performed by an annotation handling system according to embodiments of the disclosure.

FIG. 3 is a flowchart depicting an exemplifying method performed by an annotation handling system 1 according to embodiments of the disclosure. Said method is for in an on edge-based manner training a supervised or semi-supervised perception model 3 on edge of a vehicle 2 equipped with an ADS 21. The exemplifying method, which may be continuously repeated, comprises one or more of the following actions discussed with support from FIGS. 1-2. Moreover, the actions may be taken in any suitable order and/or one or more actions may be performed simultaneously and/or in alternate order where applicable. For instance, Actions 1003 and 1004 may be performed in alternate order and/or simultaneously.

Action 1001

In Action 1001, the annotation handling system 1 stores—e.g. with support from the sensor data storing unit 101—while the vehicle 2 is being driven, sensor data 4 obtained from a set of onboard surrounding detecting sensors 23.

Action 1002

In Action 1002, the annotation handling system 1 selects—e.g. with support from the data selecting unit 102—based on selection criteria, annotation-eligible data 5 out of the sensor data 4.

Action 1003

In Action 1003, the annotation handling system 1 generates—e.g. with support from the model candidate generating unit 103—a learning model candidate 51 by annotating an event comprised in the annotation-eligible data 5, using a perception learning model.

Optionally, Action 1003 of generating a learning model candidate 51 may comprise—and/or the model candidate generating unit 103 may be adapted and/or configured for—said generating being enabled provided the vehicle 2 not being driven.

Action 1004

In Action 1004, the annotation handling system 1 generates—e.g. with support from the corroboration candidate generating unit 104—at least a first corroboration candidate 52, 53 by annotating the event based on perception predictions of the event derived from radar- and/or lidar-based sensor data of the obtained sensor data 5 and/or based on identifying the event in a digital map 22.

Optionally, Action 1004 of generating at least a first corroboration candidate 52, 53 may comprise—and/or the corroboration candidate generating unit 104 may be adapted and/or configured for—said generating being enabled provided the vehicle 2 not being driven.

Further optionally, Action 1004 of generating at least a first corroboration candidate 52, 53 may comprise—and/or the corroboration candidate generating unit 104 may be adapted and/or configured for—generating at least a first corroboration candidate 52, 53 by further annotating the event based on human-provided input 241 provided with support from a user interface 24 within the vehicle 2.

Moreover, optionally, further annotating the event based on human-provided input 241 may comprise—and/or the corroboration candidate generating unit 104 may be adapted and/or configured for—said further annotating being enabled provided each of a radar, lidar- and/or digital map-based corroboration candidate 52, 53 failing to match the learning model candidate 51 to an extent fulfilling the corroboration criteria.

Action 1005

In Action 1005, the annotation handling system 1 determines—e.g. with support from the annotation determining unit 105—when one or more of the at least first corroboration candidate 52, 53 match the learning model candidate 51 to an extent fulfilling predeterminable corroboration criteria, an annotation 7 of the event, which annotation 7 is based on both the learning model candidate 51 and the one or more at least first corroboration candidate 52, 53.

Optionally, Action 1005 of determining an annotation 7 of the event may comprise—and/or the annotation determining unit 105 may be adapted and/or configured for—fusing the learning model candidate 51 and the one or more at least first corroboration candidate 52, 53 in accordance with predeterminable fusion criteria stipulating conditions for combining the learning model candidate 51 and the one or more at least first corroboration candidate 52, 53.

Action 1006

Figure 5:
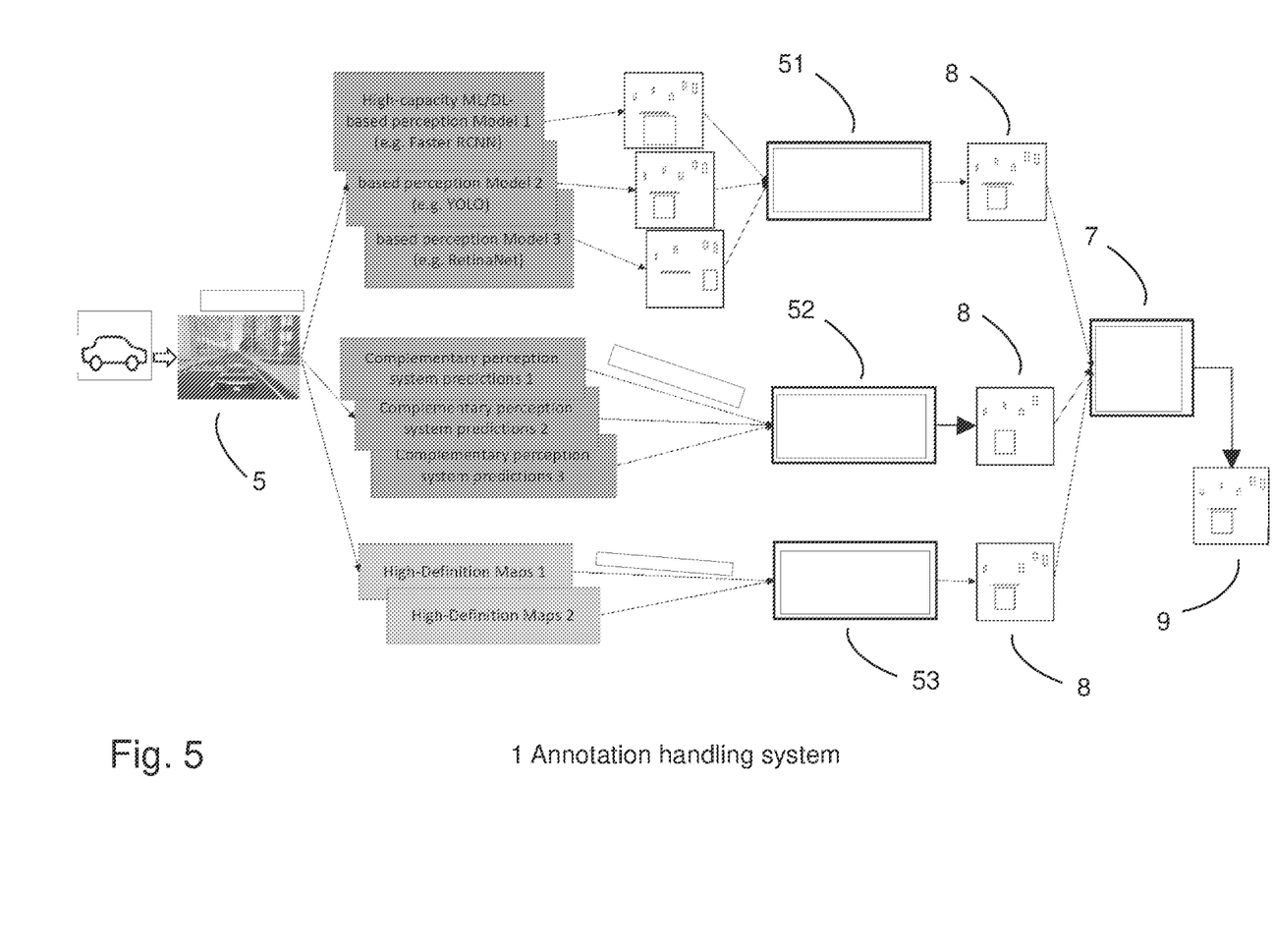
FIG. 5 illustrates a schematic view of an exemplifying alterative annotation process of an exemplifying annotation handling system according to embodiments of the disclosure.

In optional Action 1006, the annotation handling system 1 may assign—e.g. with support from the optional confidence assigning unit 106—the annotation 7 a confidence value 9 based on—as illustrated in exemplifying FIG. 5—aggregated and/or combined respective confidence values 8 associated with the learning model candidate 51 and corroboration candidate 52, 53 fulfilling the corroboration criteria, and/or based on extent of the match.

Action 1007

In Action 1007, the annotation handling system 1 updates—e.g. with support from the perception model updating unit 107—the perception model 3 based on the annotation 7.

Optionally, should Action 1007 follow upon optional Action 1006 of assigning the annotation 7 a confidence value 9, then Action 1007 of updating the perception model 3 may comprise—and/or the perception model updating unit 107 may be adapted and/or configured for—updating the perception model 3 based on the annotation 9, provided said confidence value fulfills predeterminable confidence criteria The person skilled in the art realizes that the present disclosure by no means is limited to the preferred embodiments described above. On the contrary, many modifications and variations are possible within the scope of the appended claims. It should furthermore be noted that the drawings not necessarily are to scale and the dimensions of certain features may have been exaggerated for the sake of clarity. Emphasis is instead placed upon illustrating the principle of the embodiments herein. Additionally, in the claims, the word "comprising" does not exclude other elements or steps, and the indefinite article "a" or "an" does not exclude a plurality.

The invention claimed is:

1. A method performed by an annotation handling system for training a supervised or semi-supervised perception model onboard a vehicle equipped with an Automated Driving System, ADS, the method comprising:
    storing while the vehicle is being driven, sensor data obtained from a set of onboard surrounding detecting sensors;
    selecting based on selection criteria, annotation-eligible data out of the sensor data;
    generating a learning model candidate by annotating an event comprised in the annotation-eligible data, using a perception learning model;
    generating at least a first corroboration candidate by annotating the event based on one or both of:
        perception predictions of the event derived from one or both of radar-based and lidar-based sensor data of the obtained sensor data; and
        identifying the event in a digital map;
    determining when one or more of the at least first corroboration candidate match the learning model candidate to an extent fulfilling predeterminable corroboration criteria, an annotation of the event, which annotation is based on both the learning model candidate and the one or more at least first corroboration candidate; and
    updating the perception model based on the annotation.

2. The method according to claim 1, further comprising:
    assigning the annotation a confidence value) based on aggregated and/or combined respective confidence values associated with the learning model candidate and corroboration candidate fulfilling the corroboration criteria, and/or based on extent of the match; and
    wherein the updating the perception learning model comprises updating the perception learning model based on the annotation, provided the confidence value fulfils predeterminable confidence criteria.

3. The method according to claim 2, wherein the determining an annotation of the event comprises fusing the learning model candidate and the one or more at least first corroboration candidate in accordance with predeterminable fusion criteria stipulating conditions for combining the learning model candidate and the one or more at least first corroboration candidate.

4. The method according to claim 2, wherein the generating of one or both of a learning model candidate and the generating at least a first corroboration candidate is enabled provided the vehicle not being driven.

5. The method according to claim 1, wherein the determining an annotation of the event comprises fusing the learning model candidate and the one or more at least first corroboration candidate in accordance with predeterminable fusion criteria stipulating conditions for combining the learning model candidate and the one or more at least first corroboration candidate.

6. The method according to claim 1, wherein the generating of one or both of a learning model candidate and the generating at least a first corroboration candidate is enabled provided the vehicle not being driven.

7. The method according to claim 1, wherein the generating at least a first corroboration candidate comprises generating at least a first corroboration candidate by further annotating the event based on human-provided input provided with support from a user interface within the vehicle.

8. The method according to claim 7, wherein the further annotating the event based on human-provided input is enabled provided each of a radar, lidar- and/or digital map-based corroboration candidate fails to match the learning model candidate to an extent fulfilling the corroboration criteria.

9. An annotation handling system for training a supervised or semi-supervised perception model onboard a vehicle equipped with an Automated Driving System, ADS, the annotation handling system comprising at least one processor configured to:
    store, while the vehicle is being driven, sensor data obtained from a set of onboard surrounding detecting sensors;
    select, based on selection criteria, annotation-eligible data out of the sensor data;
    generate a learning model candidate by annotating an event comprised in the annotation-eligible data, using a perception learning model;
    generate at least a first corroboration candidate by annotating the event based on one or both of:
        perception predictions of the event derived from one or both radar-based and lidar-based sensor data of the obtained sensor data; and
        based on identifying the event in a digital map;
    determine when one or more of the at least first corroboration candidate match the learning model candidate to an extent fulfilling predeterminable corroboration criteria, an annotation of the event, which annotation is based on both the learning model candidate and the one or more at least first corroboration candidate; and
    update the perception model based on the annotation.

10. The annotation handling system according to claim 9, wherein the at least one processor is further configured to:
    assign the annotation a confidence value based on one or both of:
        one or both aggregated and combined respective confidence values associated with the learning model candidate corroboration candidate fulfilling the corroboration criteria; and based on extent of the match; and update the perception learning model based on the annotation, provided the confidence value fulfils predeterminable confidence criteria.

11. The annotation handling system according to claim 10, wherein the at least one processor is configured to fuse the learning model candidate and the one or more at least first corroboration candidate in accordance with predeterminable fusion criteria stipulating conditions for combining the learning model candidate and the one or more at least first corroboration candidate.

12. The annotation handling system according to claim 10, wherein the at least one processor is configured to one or both:
generate a learning model candidate; and
generate at least a first corroboration candidate, provided the vehicle is not being driven.

13. The annotation handling system according to claim 10, wherein the at least one processor is configured to generate at least a first corroboration candidate by further annotating the event based on human-provided input provided with support from a user interface within the vehicle.

14. The annotation handling system according to claim 9, wherein the at least one processor is configured to fuse the learning model candidate and the one or more at least first corroboration candidate in accordance with predeterminable fusion criteria stipulating conditions for combining the learning model candidate and the one or more at least first corroboration candidate.

15. The annotation handling system according to claim 9, wherein the at least one processor is configured to one or both:
generate a learning model candidate; and
generate at least a first corroboration candidate, provided the vehicle is not being driven.

16. The annotation handling system according to claim 9, wherein the at least one processor is configured to generate at least a first corroboration candidate by further annotating the event based on human-provided input provided with support from a user interface within the vehicle.

17. The annotation handling system according to claim 16, wherein the at least one processor is configured to enable further annotation of the event based on human-provided input, provided each of one or more of a radar, lidar- and digital map-based corroboration candidate fails to match the learning model candidate to an extent fulfilling the corroboration criteria.

18. The annotation handling system according to claim 9, where the annotation handling system is comprised in a vehicle.

19. A non-transitory computer readable storage medium storing a computer program containing computer program code arranged to cause a computer or a processor to perform a method for training a supervised or semi-supervised perception model onboard a vehicle equipped with an Automated Driving System, ADS, the method comprising:

storing while the vehicle is being driven, sensor data obtained from a set of onboard surrounding detecting sensors;

selecting based on selection criteria, annotation-eligible data out of the sensor data;

generating a learning model candidate by annotating an event comprised in the annotation-eligible data, using a perception learning model;

generating at least a first corroboration candidate by annotating the event based on one or both of:
perception predictions of the event derived from one or both of radar-based and lidar-based sensor data of the obtained sensor data; and
identifying the event in a digital map;

determining when one or more of the at least first corroboration candidate match the learning model candidate to an extent fulfilling predeterminable corroboration criteria, an annotation of the event, which annotation is based on both the learning model candidate and the one or more at least first corroboration candidate; and updating the perception model based on the annotation.

20. The non-transitory computer readable storage medium according to claim 19, wherein the method further comprises:

assigning the annotation a confidence value based on aggregated and/or combined respective confidence values associated with the learning model candidate and corroboration candidate fulfilling the corroboration criteria, and/or based on extent of the match; and wherein the updating the perception learning model comprises updating the perception learning model based on the annotation, provided the confidence value fulfils predeterminable confidence criteria.

* * * * *